(12) United States Patent
Decal

(10) Patent No.: US 8,365,778 B1
(45) Date of Patent: Feb. 5, 2013

(54) TURKEY BASTER

(76) Inventor: Diego L. Decal, North Lauderdale, FL (US)

( * ) Notice: Subject to any disclaimer, the term of this patent is extended or adjusted under 35 U.S.C. 154(b) by 2002 days.

(21) Appl. No.: 11/184,697

(22) Filed: Jul. 19, 2005

Related U.S. Application Data

(60) Provisional application No. 60/589,028, filed on Jul. 19, 2004.

(51) Int. Cl.
    *B65B 1/04* (2006.01)
(52) U.S. Cl. .......................................... 141/26; 99/346
(58) Field of Classification Search ................ 141/18, 141/21, 25, 26, 65, 94, 98, 352; 222/209, 222/210, 214; 239/327; 99/345, 346; D7/669
See application file for complete search history.

(56) References Cited

U.S. PATENT DOCUMENTS

| | | | |
|---|---|---|---|
| 811,801 A * | 2/1906 | Smith | 222/108 |
| 2,234,884 A * | 3/1941 | Teel | 239/327 |
| 3,410,457 A * | 11/1968 | Brown | 222/191 |
| 4,023,305 A * | 5/1977 | Harschel | 47/81 |
| D366,993 S * | 2/1996 | Fielding et al. | D7/669 |
| 5,875,823 A * | 3/1999 | Porter | 141/26 |
| 6,244,308 B1 | 6/2001 | Bignon | |
| 6,354,337 B1 | 3/2002 | Odessky | |
| 6,457,400 B1 | 10/2002 | Hutzler | |
| 6,575,204 B1* | 6/2003 | Godfrey et al. | 141/26 |

* cited by examiner

*Primary Examiner* — Timothy L Maust
(74) *Attorney, Agent, or Firm* — Alvin S. Blum

(57) ABSTRACT

A baster for aspirating liquids from a roasting pan and distributing the liquids on the food roasting in the pan is a long straight tube with a rubbery bulb at a first open end. A second open end of the tube is narrow. The tube has a bend adjacent the second end. The bend is less than ninety degrees from the long axis of the tube. This enables the baster to more easily aspirate liquids from a roasting pan in the oven, since there is less vertical clearance required to reach the bottom of the pan. Use of this device does not require pulling the pan so far out of the oven than when basting as with straight basters.

11 Claims, 1 Drawing Sheet

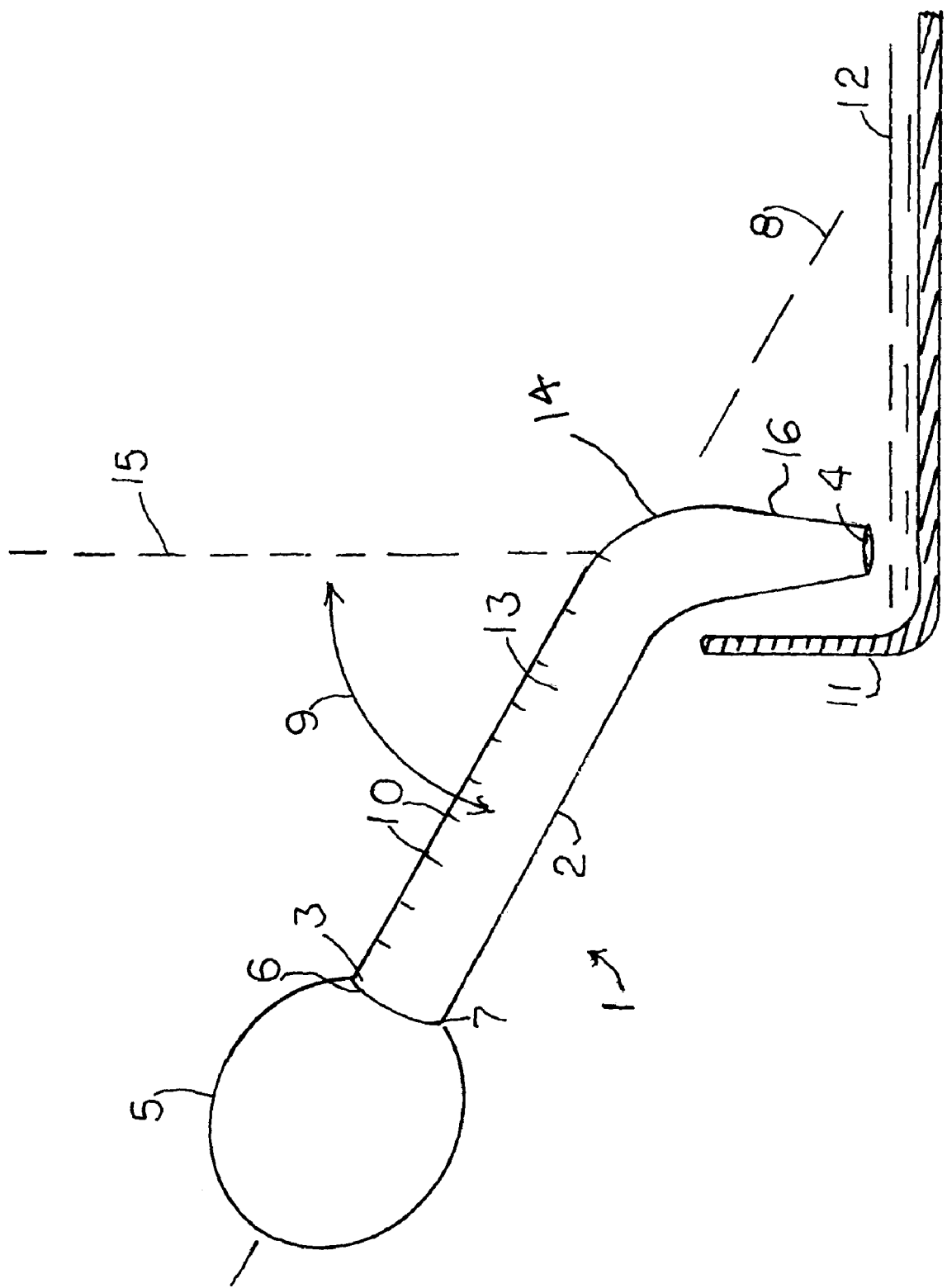

TURKEY BASTER

Applicant claims priority of provisional patent application 60/589,028 filed Jul. 19, 2004 incorporated herein by reference.

BACKGROUND OF THE INVENTION

This invention relates to cooking utensils, and more particularly to a baster for aspirating liquids from a roasting pan and then pouring them over the roasting food. It is often desirable to distribute liquids over the cooking foods. This is especially useful when a large piece of meat or turkey is being roasted in an oven. It is common practice to employ a baster to aspirate some of the juices accumulating in the roasting pan and pour them over the meat at intervals during the cooking process. A large tube with a narrow tip at a first end is used for this process. Suction is created by a rubber bulb at the second end. When this is done during the roasting process, the pan must be moved out of the oven enough so that the narrow tip can reach the liquid in the pan while the bulb is elevated. This reduces the cooking temperature an unpredictable amount, and slows the cooking.

SUMMARY OF THE INVENTION

It is accordingly an object of the invention to provide a baster that can be used to baste a turkey or a roast without requiring the pan to be moved so far out of the oven. The basting device of the invention is a hollow tube with a large diameter first end provided with a resilient, elastic bulb to provide controlled suction. The second end of the tube is narrow. The second end is bent at an angle of less than ninety degrees from the elongate central axis of the tube. The second end may be immersed in the pan liquid for aspiration of the pan juices without great elevation of the second end. The juices may then be aspirated without having to pull the pan so far out of the oven. The tube is preferably made of a thermoplastic material that will not melt when briefly exposed to the pan juices. It is less likely to break with release of dangerous particles in use than a glass tube. The bulb is preferably made of rubber or a suitable elastomer. These and other objects, features, and advantages of the invention will become more apparent when the detailed description is studied in conjunction with the drawings, in which like elements are designated by like reference characters in the various drawing figures.

BRIEF DESCRIPTION OF THE DRAWING

The drawing FIGURE is a perspective view of the invention in use with a pan shown in section.

DETAILED DESCRIPTION OF PREFERRED EMBODIMENTS

Referring now to the drawing, the baster 1 of the invention is shown in use. It is inserted into a roasting pan 11 to aspirate the pan juices. The baster includes an elastic bulb 5 that may be made of rubber or a rubbery material such as a thermoplastic elastomer. The bulb 5 has an open end 6 that is hermetically sealed to an elongate rigid tube 2 at a large diameter first open end 3 of the tube. The hermetical seal 7 is achieved by providing the bulb opening with a smaller diameter than the tube, so that the bulb stretches tightly on the tube. The second open end 4 of the tube is much smaller than the tube. This facilitates aspiration of the pan liquid into the internal volume of the tube that is sufficient to hold basting fluid in a manner well known in the art. The tube 2 has a major straight, non-tapered portion 3 extending along a first central axis 8. A bend 14 of the tube connects portion 3 to a minor tapered portion 16 having a central axis 15 adjacent the second open end 4. The angle 9 of the bend 14 between the axis 8 and the axis 15 is less than ninety degrees. This enables a user to aspirate liquids 12 from the pan 11 with less overhead clearance than would be required for a straight tube that would lie along the axis 15. This reduces the danger of burns. It also enables a user to baste food without moving the pan so far out of the oven. This prevents the oven and food from cooling during basting, thereby accelerating cooking and making it more predictable.

The tube may be transparent, translucent or opaque. It is preferably translucent or transparent if graduations 10 are to be provided. The tube is preferably made of a thermoplastic material. Vitreous materials such as glass are much heavier and may chip, accidentally leaving shards in the food.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A baster comprising:
   a) an elastic bulb having an open end;
   b) an elongate rigid tube having a large diameter first open end and a small diameter second open end, the tube having an internal volume sufficient to hold a basting fluid;
   c) the bulb hermetically sealed to the first end;
   d) the tube having a major straight, non-tapered portion extending along a first central axis and terminating in the large diameter first open end;
   e) the tube having a minor tapered portion extending along a second central axis and terminating in the small diameter second open end; and
   f) a bend of less than ninety degrees from the first axis to the second axis in the tube adjacent the second open end.

2. The baster according to claim 1, in which the tube is formed of a thermoplastic material.

3. The baster according to claim 2, in which the bulb is formed from rubber.

4. The baster according to claim 2, in which the bulb is made from a thermoplastic elastomer.

5. The baster according to claim 1, in which the bulb is made from a thermoplastic elastomer.

6. The baster according to claim 1, in which the bulb is formed from rubber.

7. The baster according to claim 1, in which the tube transmits light and is provided with graduations.

8. A baster comprising:
   a) an elastic bulb having an open end;
   b) an elongate thermoplastic tube having a large diameter first open end and a small diameter second open end, the tube having an internal volume sufficient to hold a basting fluid;
   c) the bulb hermetically sealed to the first end;
   d) the tube having a major straight portion extending along a first central axis and terminating in the first open end; the tube having a minor tapered portion extending along a second central axis and terminating in the small diameter second open end; and
   e) a bend of less than ninety degrees from the first axis to the second axis in the tube adjacent the second open end.

9. The baster according to claim 8, in which the bulb is formed from rubber.

10. The baster according to claim 8, in which the bulb is made from a thermoplastic elastomer.

11. The baster according to claim 8, in which the tube transmits light and is provided with graduations.

* * * * *